United States Patent [19]

Molteni et al.

[11] Patent Number: 5,576,853

[45] Date of Patent: Nov. 19, 1996

[54] APPARATUS AND METHODS FOR MAKING TRANSMISSION HOLOGRAMS

[75] Inventors: William J. Molteni, Waltham; Michael M. Wenyon, Boston, both of Mass.

[73] Assignee: Polaroid Corporation, Cambridge, Mass.

[21] Appl. No.: 360,210

[22] Filed: Dec. 20, 1994

[51] Int. Cl.[6] ........................................ G03H 1/20
[52] U.S. Cl. .................................. 359/12; 359/8
[58] Field of Search ................. 359/2, 8, 12, 30, 359/599; 355/2

[56] References Cited

U.S. PATENT DOCUMENTS

| | | | |
|---|---|---|---|
| 3,636,838 | 1/1972 | Chang et al. | 359/8 |
| 3,731,994 | 5/1973 | Wick et al. | 359/12 |
| 4,209,250 | 6/1980 | James et al. | 355/18 |
| 4,416,540 | 11/1983 | Nicholson | 350/3.69 |
| 4,487,472 | 12/1984 | Asano | 350/3.71 |
| 4,715,670 | 12/1987 | Turukhano | 350/3.69 |
| 4,973,113 | 11/1990 | Harrington et al. | 350/3.65 |
| 4,995,685 | 2/1991 | Armstrong et al. | 350/3.65 |
| 5,044,707 | 9/1991 | Mallik | 359/2 |
| 5,046,793 | 9/1991 | Hockley et al. | 359/12 |
| 5,066,133 | 11/1991 | Brienza | 359/12 |
| 5,085,514 | 2/1992 | Mallik et al. | 359/2 |
| 5,198,914 | 3/1993 | Arns | 359/8 |

FOREIGN PATENT DOCUMENTS

| | | | |
|---|---|---|---|
| 0333644 | 9/1989 | European Pat. Off. | G03H 1/20 |
| 52-16246 | 7/1977 | Japan | 359/8 |
| 55-69179 | 5/1980 | Japan | 359/8 |
| 3-64785 | 3/1991 | Japan | G03H 1/20 |
| 2-235085 | 9/1991 | Japan | G08H 1/20 |
| 5-249876 | 9/1993 | Japan | 359/12 |

OTHER PUBLICATIONS

PCT International Search Report for PCT/US95/16203 (Forms PCT/ISA/210 and 220) (mailed 26 Apr. 1996).

M. L. Armstrong and D. F. Tipton, "Machine for Continuous Hologram Production", SPIE, vol. 1914, Practical Holography VII, (1993). (No month).

F. S. Harris, Jr., G. C. Sherman, and B. H. Billings, Appl. Opt. 5, 665 (1966). (No month).

M. Wenyon and P. Ralli, "Mass Production of Volume Holographic Diffusers," 1994 SID International Symposium Digest of Technical Papers, San Jose, CA (Jun. 14–16, 1994) (ISSN 0097–966X).

*Primary Examiner*—Jon W. Henry
*Attorney, Agent, or Firm*—Renato M. de Luna

[57] ABSTRACT

Apparatus and methods are provided for mass production of transmission holograms onto a continuous web of photosensitive material, one method involving the mounting of a master transmission hologram onto the outside surface of a clear hollow drum, the clear hollow drum being rotatable and having means for directing an irradiating wavefront propagated from a radiation source through the master transmission hologram onto a passing recording medium in a predetermined direction, the directing means configured so that said predetermined direction is fixedly maintainable independent of the rotation of the hollow drum and the master transmission hologram mounted thereon. The redirected irradiating wavefront transmitted through the master transmission hologram generates an object beam and a "zero order" reference beam, said object beam and "zero order" reference beam combine to form an interference pattern, the interference pattern being recorded on the photosensitive recording medium.

17 Claims, 4 Drawing Sheets

FIG. 1

PRIOR ART

APPARATUS AND METHODS FOR MAKING TRANSMISSION HOLOGRAMS

FIELD OF THE INVENTION

In general, the present invention relates to apparatus and methods for making transmission holograms and, more particularly, apparatus and methods for making transmission holograms utilizing directing means for fixedly directing an irradiating wavefront through a passing transmissive master and recording medium, the transmissive master and recording medium being thereby scan-wise irradiated.

BACKGROUND OF THE INVENTION

Holography is an image-recording process distinct from other image-recording processes; both the phase and amplitude of a wavefront that intercept the recording medium are recorded.

In the production of holograms in general, an object to be imagewise recorded is irradiated with a first component split from a coherent radiation source (e.g., from a laser). Irradiation reflected from the object is directed toward an appropriately sensitized recording medium (e.g., recording media based on photopolymers, hardened dichromated gelatin, or silver halide). A beam of reflected coherent radiation is commonly termed an object beam. At the same time, a second component split from the coherent radiation source is directed to the recording medium, bypassing the object. A beam of such coherent radiation is commonly termed a reference beam. The interference pattern resultant of the interaction of the reference beam and the object beam impinging on the recording medium is latently recorded in the recording medium. When the photoexposed recording medium is processed (e.g., for development of the latent recordation) and subsequently appropriately illuminated and observed at an appropriate angle (i.e., generally an angle correspondent with the incident angle of the reference beam), the irradiation is diffracted by the interference pattern (cf., the hologram) to reconstruct the wavefront that originally reached the recording medium as reflected from the object.

Holograms that are formed by allowing reference and object beams to enter a recording medium from the same side are known as transmission holograms. Interaction of the object and reference beams in a photopolymeric recording medium forms fringes of material with varying refractive indices that are approximately normal to the plane of the recording medium. When the hologram is "played back" for viewing using transmitted radiation, these fringes refract the transmitted radiation to produce real and virtual images. The present invention is directed to the production of such transmission holograms, particularly, but without limitation, those of the so-called volume phase type.

Historically, despite their unique optical capabilities, volume phase holographic elements have proven difficult to manufacture because they require an exposure with coherent radiation of sufficient energy to record interference structures that extend throughout the thickness of a photosensitive recording medium. In conjunction with their energy requirements, as well as their comparatively precise and exacting process requirements, the production of original transmission holograms (volume-phase or otherwise) is oftentimes burdened with high manufacturing costs, inefficient production times and poor yields. In light of these concerns, the mass production of transmission holograms has been investigated. Several of such methods implement known principles of "contact copying" to produce multiple copies of an original master transmission hologram. (The principles of contact copying are discussed further below.)

Among the previously available automated systems for contact copying transmission holograms are "freeze-frame" type systems, cf., U.S. Pat. No. 4,209,250, issued to James et al. on Jun. 24, 1980; and U.S. Pat. No. 4,416,540, issued to Nicholson on Nov. 22, 1983. Such systems usually include components that advance recording materials, couple the materials to a master hologram, allow for settling time, and expose the film. The cycle time for "freeze-frame"-type systems is considered to be comparatively slow for very large volume production, and accordingly ill-suited for the goals sought and considered in the development of the present invention.

Apart from freeze-frame type systems, another system for contact copying transmission holograms is suggested in U.S. Pat. No. 4,973,113, issued to Harrington et al. on Nov. 27, 1990. Harrington et al. suggest the use of a "rotatable drum adapted to receive a beam of actinic radiation on a reflector in the drum reflecting a portion of the beam through a master to a recording medium to form the transmission hologram in the recording medium." The mirror used to reflect light in the embodiments suggested by Harrington, et al. is mounted directly to their rotatable drum; the mirror—as well as the direction of the light reflected thereby—moves correspondent with the rotation of the drum. By such configuration, the reflected light is continuously and blanketwise transmitted through a mounted master transmission hologram for a duration required to effect contact copying.

In consideration of the goals sought by the applicants, the implementation of Harrington, et al.'s apparatus is regarded to be constrained by several of its inherent aspects. First, the apparatus appears to require a large, flood-like exposure area, thereby compelling comparatively complicated control mechanisms for maintaining appropriate and desired exposing conditions. Second, it appears that unless a very high power laser is used to effect such overall exposure, a comparatively long exposure time would be required. During that time the holographic recording material and master transmission hologram could alter their relative positions and a hologram with unclear fringes would result. Third, since the mirror is disclosed as being mounted directly within and onto the drum, it is concluded that the mirror would be susceptible to vibrations resultant of drum rotation. Such vibrations may disturb the phase relationships necessary for effecting a desirable contact copy of the master transmission hologram. Further, the flood-like overall exposure involved with such apparatus together with the fixedly drum mounted mirror is believed to substantially foreclose the ability to control the angle of incidence used to effect reconstruction of a master transmission hologram onto a recording medium.

The limitations of the existing art highlight the need for an apparatus to mass produce transmission holograms more reliably, efficiently, and with greater flexibility.

SUMMARY OF THE INVENTION

A system is herein described which is well-suited to the manufacture of transmission holograms on a continuous web of photosensitive material. In accomplishing this end, the present invention utilizes a cylindrical drum, and directing means for fixedly directing an irradiating wavefront through a passing transmissive master and recording medium, the transmissive master and recording medium being thereby scan-wise irradiated.

In a principle representative embodiment, the system involves mounting a master transmission hologram onto the outside of a hollow clear drum. The master transmission hologram is then "played back" onto a recording medium by irradiating said master with an irradiating wavefront (coherent or semi-coherent) first propagated through an open end of the drum, then directed through the drum toward and ultimately through the mounted master transmission hologram. Both ends of the drum are open, and the drum is free to turn, for example, on bearings around the outside of the drum. The drum rotates at a constant speed. During "play back", a continuous web of recording medium is passed around the drum in register with the master transmission hologram. Play back of the master (cf., reconstruction of the recorded object beam) onto the recording medium is typically accomplished with a planar slit of coherent laser light. Directing the illuminating beam onto the master hologram is typically accomplished by means of a reflector (e.g., a mirror) positioned inside the drum. The mirror is supported independently of the drum, for example, by a support structure standing, or otherwise placed or positioned outside the drum, and with an element thereof extending into and through an open opposite end of said drum. The master transmission hologram uses some of the redirected irradiation to generate a diffracted object beam or beams. The object beam transmitted through the master and the unused portion of the redirected irradiation (cf., reference beam) combine to form an interference pattern, the interference pattern being recorded on the photosensitive recording medium. Typically, the irradiating wavefront is focused toward the center of the cylinder on the axial line of the cylinder to intercept a reflector which can be adjusted to fixedly direct the wavefront to a direction substantially perpendicular to a tangent line of the surface of the master transmission hologram.

It is an object of the present invention to provide a system useful for making transmission holograms on successive segments of a continuous web of a recording medium.

It is a further object of the present invention to provide a system capable of making transmission holograms by fixedly directing an irradiating wavefront through a transmissive master onto a recording medium, the transmissive master and recording medium being scan-wise irradiated in passing.

It is a further object of the present invention to provide a system for producing mass quantities, at relatively high speeds, of transmission holograms, diffraction gratings, holographic diffusers, transmission holograms, and other like products.

It is a further object of the present invention, to provide a holographic imager wherein the optics, equipment, and other components thereof are easily maintainable and quickly removed or installed to flexibly accommodate other exposure geometries.

It is a further object of the present invention to provide a holographic imager useful in the production of a transmission hologram on a recording medium, the holographic imager comprising a radiation source for propagating an irradiating wavefront, the irradiating wavefront capable of effecting the production of transmitted wavefronts when said irradiating wavefront is transmitted through a transmissive master, the transmitted wavefronts capable of combining to form a recordable interference pattern, the interference pattern being holographically representative of the transmissive master; a cylindrical member rotatable on a longitudinal axis, an area of the cylindrical member configured to substantially transmit said irradiating wavefront; the cylindrical member having the transmissive master in said area, the transmissive master capable of producing said transmitted wavefronts when exposed to said irradiating wavefront; means for conveying the recording medium onto the cylindrical member in register with the transmissive master, the recording medium capable of recording said interference pattern; and directing means for directing said irradiating wavefront propagated from the radiation source through the transmissive master toward the recording medium in a predetermined direction, the directing means configured so that said predetermined direction is fixedly maintainable independently of the rotation of the cylindrical member.

It is a further object of the present invention to provide a method for producing transmission holograms on a recording medium, the method comprising the steps of: providing a cylindrical member rotatable on a longitudinal axis, an area of the cylindrical member configured to substantially transmit an irradiating wavefront, the cylindrical member having a transmissive master, the transmissive master capable of producing transmitted wavefronts when exposed to an irradiating wavefront, the transmitted wavefronts capable of combining to form a recordable interference pattern, the interference pattern being holographically representative of the transmissive master; rotating said cylindrical member while conveying the recording medium onto said cylindrical member in register with said transmissive master, the recording medium capable of recording said interference pattern; scanning said transmissive master with an irradiating wavefront to produce transmitted wavefronts which combine to form said interference pattern in the recording medium, the interference pattern thereby being latently recorded in the recording medium, said scanning irradiation occurring contemporaneously with said rotating of said cylindrical member and said conveying said recording medium, said irradiating wavefront being fixedly directed at a substantially constant angle of incidence and sequentially exposing said transmissive master and recording medium in passing; and processing the recording medium to develop the latent interference pattern, whereby a transmission hologram is produced.

For further understanding of the nature and objects of the invention, reference should be had to the following description taken in conjunction with the accompanying drawings.

BRIEF DESCRIPTION OF THE DRAWINGS

Each of FIGS. 1 to 5 provide schematic representational illustrations. The relative locations, shapes, and sizes of objects have been exaggerated to facilitate discussion and presentation herein.

DETAILED DESCRIPTION OF THE INVENTION

By the subject matter described herein, a system is provided for manufacturing transmission holograms. With several unprecedented aspects and features, certain embodiments of the inventive system find related foundation in principles underlying holographic "contact copying." Details attendant the practice of contact copying may be found, for example, in U.S. Pat. Nos. 4,209,250; 4,575,192; and 4,416,540. Reference may also be had to, for example, F. S. Harris, Jr., et al., *Appl. Opt.*, Vol. 5, No. 12, 665 (1966); and R. J. Collier, et al., *Optical Holography*, pp. 564–572 (1971). More general principles relating to holography in the broader sense may be found, for example, in "Photography by Laser" by E. N. Leith and J. Upatnieks in *Scientific American*, 212, No. 6, pages 24–35 (June, 1965); and "Holography" by C. C. Guest, in *Encyclopedia of Physical Science and Technology* Vol. 6, pages 507–519, R. A. Meyers, Ed., Academic Press, Orlando, Fla., 1987.

Figure 2:
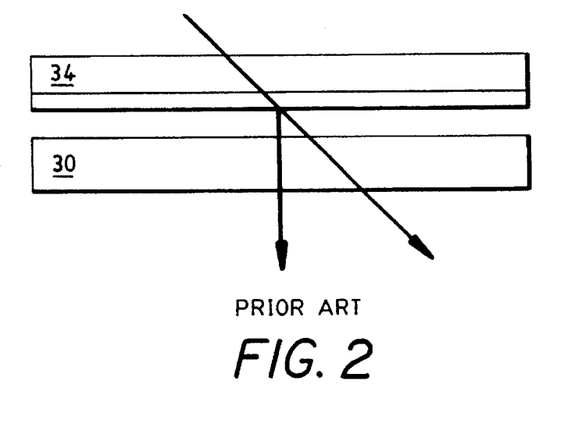
FIG. 2 is a lateral view of a master transmission hologram being irradiated with a beam of coherent light (in accord with known principles) to generate transmitted "object" and "reference" beams, which combine in practice to produce a "contact copy" of the master transmission hologram on a recording medium.

Briefly, with reference to FIG. 2, contact copying of a transmission hologram will typically involve initially bringing a master transmission hologram 34 into register with an unexposed piece of photosensitive recording medium 30. As used herein, the term "in register" can be construed as connoting an interfacially adjacent relationship with predetermined boundaries of a recording medium aligned at least with the area of a master desired for duplication. Accordingly, for example, an interfacially adjacent web of recording medium having its width aligned with a master's width and having a length longer than the master's length can be considered as being in register. Further, a master and a recording medium optically united with, for example, index matching fluid at their interface, although not strictly interfacially contiguous, are nonetheless interfacially adjacent.

With the master and the medium in register, an exposure is then performed by illuminating the master transmission hologram 34 with an appropriate reconstruction beam. The resultant transmitted wavefront will generate an image (cf., a playback image) from the master 34 that acts as a subject, or "object beam" for the copy hologram. A residual "zero order" beam will also be transmitted through the master transmission hologram 34, this wavefront acting as a "reference beam" for the copy hologram. When these transmitted wavefronts combine, an interference pattern correspondent with the master transmission hologram is produced and recorded on photosensitive recording medium 30.

Briefly, in consideration of the principles underlying contact copying, and in accord with primary embodiments of the present invention, a master transmission hologram is mounted onto the outside surface of a hollow, rotatable, light transmissive drum. The master transmission hologram is "played back" with illumination first propagated through an open end of the drum, then redirected through the drum toward and ultimately through the mounted master transmission hologram During play back, a continuous web of recording media is passed around the drum in register with the master transmission hologram and the drum rotated at a constant speed. The irradiation directed through said drum's open end is redirected toward the mounted master transmission hologram by means of a reflective element positioned inside the drum, the reflective element being supported independently of the drum, for example, by a support structure standing, or otherwise placed or positioned outside the drum, and with an element thereof extending into and through an open opposite end of said drum. Consistent with the aforementioned principles of "contact copying", the master transmission hologram uses some of the redirected illumination to generate a diffracted object beam or beams. The object beam transmitted through the master and the unused portion of the illumination beam (cf., reference beam) combine to form an interference pattern, which is then recorded on the photosensitive recording medium.

While the present invention is especially well suited for the duplication of transmission holograms, it will be appreciated that certain planar optical elements—such as diffraction gratings and diffusers—may also be placed in register with a recording medium and irradiated to form a hologram. As with "contact copying", appropriate irradiation will produce transmitted wavefronts, the wavefronts combining to produce an interference pattern recordable as an original transmission hologram on the recording medium. Accordingly, to produce a transmission hologram on a recording material, for the purposes of the present invention, it is not critical that the transmitted wavefronts, i.e. , those that combine to form a recordable interference pattern, originate from the irradiation of a master transmission hologram. Rather, in the practice of the present invention, any "transmissive master" capable of producing transmitted wavefronts may be utilized, said transmitted wavefronts being capable of combining to form an interference pattern recordable on a selected recording media. As used herein, the term "transmissive master" shall not be limited to a master transmission hologram.

Figure 1:
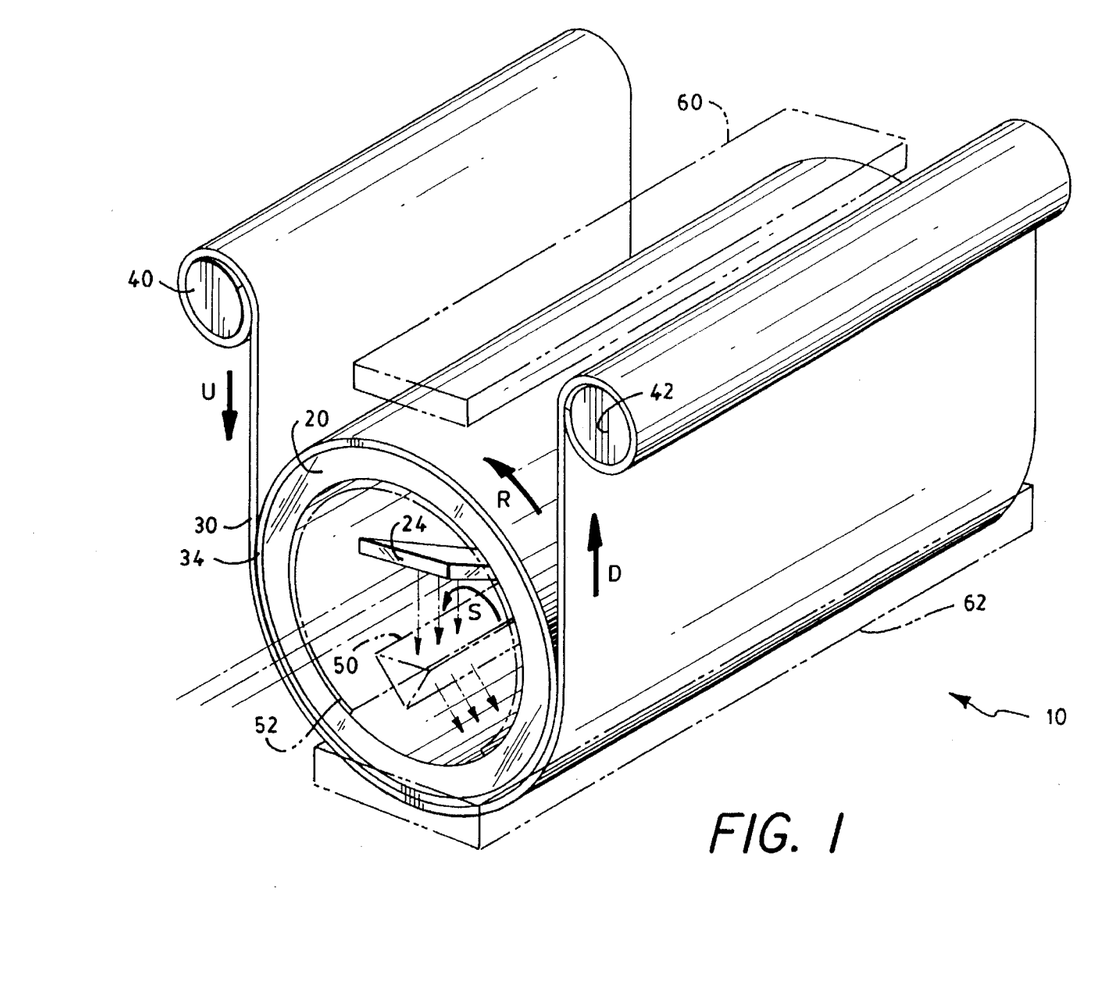
FIG. 1 is a cross-sectional front lateral view of a principal embodiment of a holographic imager according to the present invention, the particular embodiment configured for the continuous production of transmission holograms on a continuous web. Certain components, i.e., those not central to the underlying principal embodiment but providing additional functionality and benefits thereto, are rendered with broken lines.

Components of a principal embodiment conforming to apparatus aspects of the present invention are schematically illustrated in FIG. 1. As illustrated, holographic imager 10 comprises cylindrical member 20, the cylindrical member being rotatable on a longitudinal axis (cf., axes a in FIGS. 3, 4, and 5). Cylindrical member 20 should be configured so that at least one area of the cylindrical member is capable of substantially transmitting an irradiating wavefront. In accord with the claimed subject matter, a transmissive master 34 (e.g., a volume phase transmission hologram) is mounted on the cylindrical member 20. The transmissive master 34 is configured to produce transmitted wavefronts when exposed to an irradiating wavefront, the transmitted wavefronts being capable of combining to form a recordable interference pattern.

Means comprising, for example, supply roll 40 and uptake roll 42, are provided for continuously conveying recording medium 30 upstream (as indicated by directional arrow U) toward cylindrical member 20 in register with transmissive master 34 and ultimately downstream (as indicated by directional arrow D) for interim storage and/or subsequent processing. While the means for conveying recording medium 30 particularly illustrated in FIG. 1 is representative of preferred continuous means for conveying a continuous web of such material, it will be appreciated that discontinuous means—for conveying, for example, individual sheets of a recording material—can be implemented within the scope of the present invention. In this regard, it is envisioned that individual sheets can be contained in a tray, individually pulled out (e.g., by a mechanical sheet feeder utilizing grippers, friction rollers, vacuum means, or the like), and transported (e.g., on a conveyor belt or a system of rollers) into register with the transmissive master. Several other devices (continuous or discontinuous) can be implemented within the scope of the present invention by one skilled in the art in view of the present disclosure.

To effect exposure, the holographic imager 10 is provided with means for directing an irradiating wavefront propagated from a radiation source (not shown in FIG. 1, but see, component 70 in FIGS. 3, 4, and 5) through the transmissive master 34 toward a recording medium 30 in a predetermined direction. These directing means are configured so that the predetermined direction is fixedly maintainable independently of the rotation of cylindrical member 20. The expression "the predetermined direction is fixedly maintainable independently of the rotation of cylindrical member" can be understood by consideration of a point of reference outside of holographic imager 10. During its rotation, any given point on cylindrical member 20 can be observed as changing its position relative to said outside point of reference. In contrast, the predetermined direction of the propagated wavefront will remain substantially constant relative to the outside point of reference regardless of the rotation of cylindrical member 20. Such fixed, maintainable directionality is accomplished by isolating the directing means from the cylindrical member 20. Accordingly, in a preferred configuration, the directing means are supported independently of the cylindrical member 20, for example, by support structure(s) standing, or otherwise placed or positioned outside the cylindrical member, and with an element thereof extending into and through an open opposite end of said cylindrical member. Other structures providing similar functionality (cf, isolating a reflective element from a drum's rotation) may be utilized in accord with the present invention by one skilled in the art in view of the present disclosure.

Representative of directing means in the embodiment represented in FIG. 1, a reflective element 24 (for example, a mirror) is provided inside cylindrical member 20 for reflecting coherent irradiation from a laser (not shown in FIG. 1, but see, FIGS. 3, 4, and 5) ultimately through master transmission hologram 34 and recording medium 30. It will be appreciated that reflective element 24 is supported independently of cylindrical member 20. While such configuration is capable of effecting good results, other equivalent configurations are available to one skilled in the art in view of the present disclosure, certain of such configurations are set forth in the description further below.

In the operation of holographic imager 10, cylindrical member 20 is made to rotate along longitudinal axis α, for example, in the direction indicated by directional arrow R. The rotation of cylindrical member 20 is accomplished substantially contemporaneously with the conveying of recording medium 30 onto cylindrical member 20 in register with transmissive master 34. Since reflective element 24 is mounted independently of cylindrical member 20, when a coherent wavefront is propagated toward reflective element 24, the reflected wavefront remains directed at a fixed, predetermined direction, as discussed above. Occurring contemporaneously with the rotation of cylindrical member 20 and conveying of recording medium 30, the fixed directionality of such irradiation effects the sequential exposure of the transmissive master 34 and the recording medium 30 as they pass the area of exposure (cf., "in passing"). By such mechanism, the exposure of recording medium 30 may be characterized as a localized, sweeping exposure (i.e., "scanning" or "scan-like" exposure). Such scanning exposure is different in function and result from a continuous, flood-like exposure, such as that likely from aforediscussed U.S. Pat. No. 4,973,113 to Harrington, et al. By such scan-like exposure—central to the practice of the present invention—the advantages of, for example, greater exposure intensity, wider control over exposure, minimized generation of parasitic reflection holograms, and more efficient resultant holograms are obtainable.

Varying configurations are available for directing an irradiating wavefront to effect exposure of recording medium 30 consonant with the scope of the present invention. Representative configurations are schematically illustrated in FIGS. 3, 4, and 5.

Figure 3:
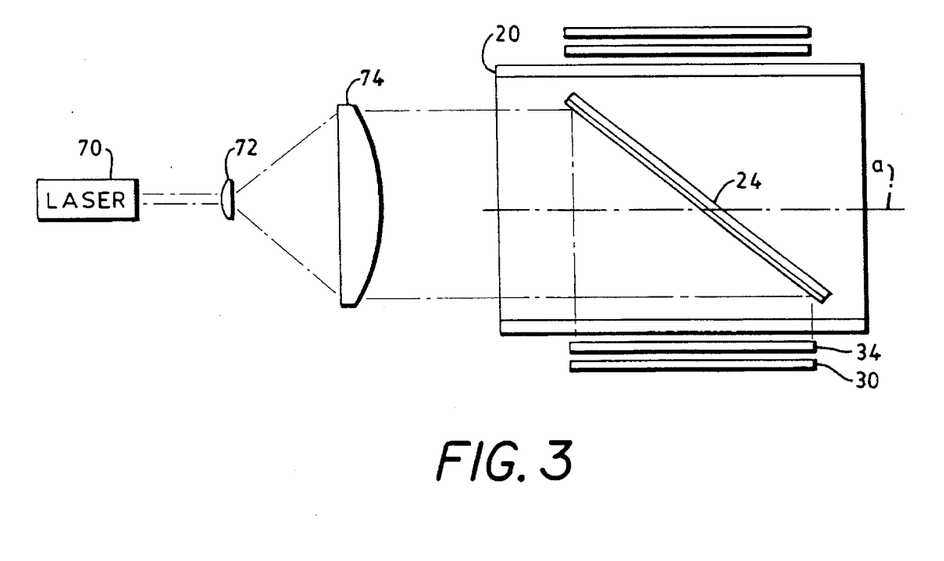
FIG. 3 is a cross-sectional lateral view illustrating a principal configuration suitable for the use of the holographic imager.

In the configuration shown in FIG. 3, a transmission hologram is copied onto recording medium 30 from master transmission hologram 34 in an apparatus wherein a coherent irradiating wavefront is propagated directly through an open end of cylindrical member 20, then directed out of cylindrical member 20 through the interfacially adjacent transmission hologram 34 and recording medium 30. As shown in FIG. 3, the coherent irradiating wavefront used for exposure is propagated by laser 70, fanned out by beam spreader 72 (such as a cylindrical telescoping lens, a spinning galvo mirror, or an oscillating galvo mirror), then collimated by cylindrical collimator 74. Reflecting element 24 inside the cylindrical member 20 is supported independently of the cylindrical member 20 by, for example, freestanding support structures (not shown). The irradiating wavefront selected for the imagewise recordable reconstruction of the master transmission hologram 34 onto recording medium 30 is maintained at a constant angle of incidence throughout the duration of the exposure sweep, thereby producing a hologram with good efficiency.

Figure 4:
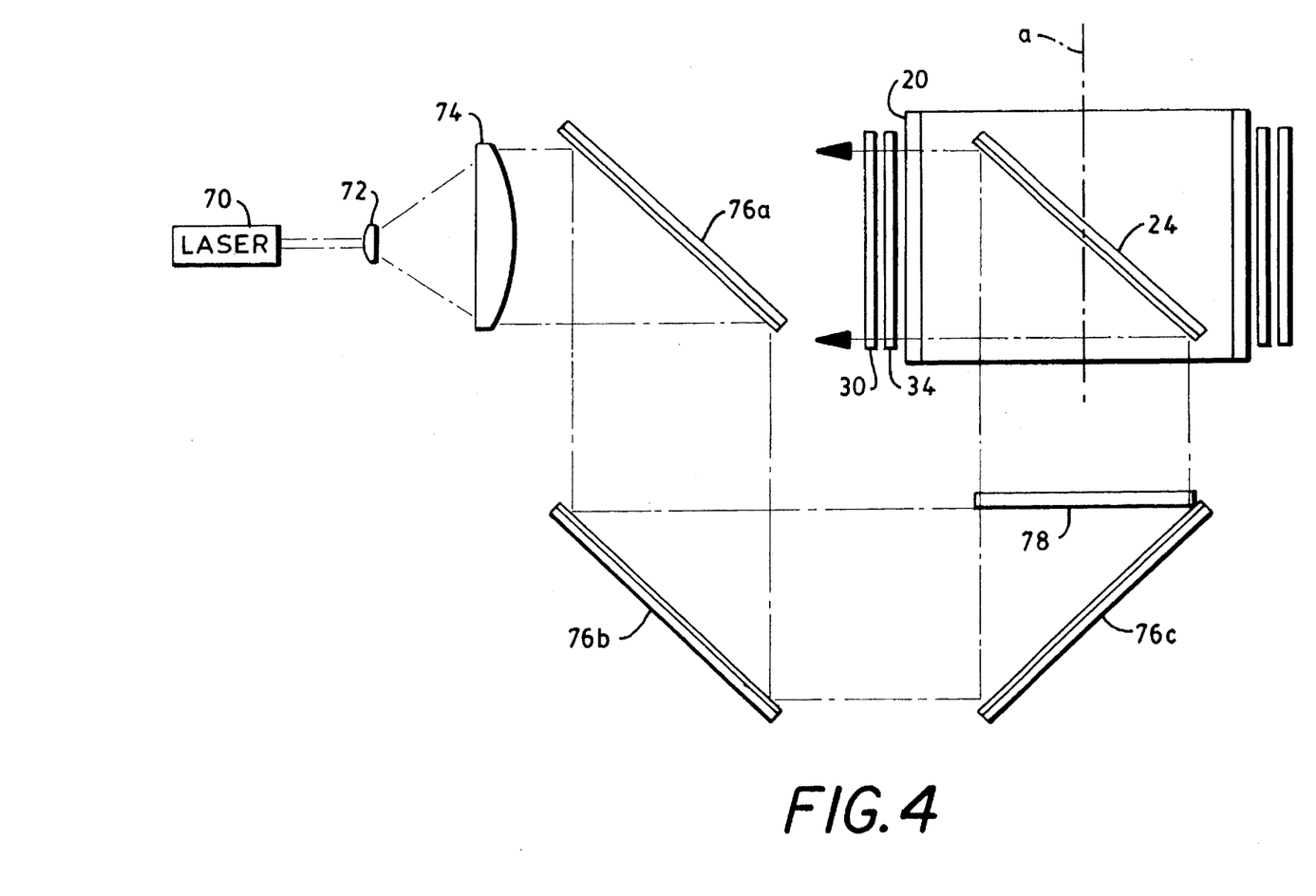
FIG. 4 is a cross-sectional top view illustrating an alternative configuration suitable for the use of the holographic imager.

In the configuration shown in FIG. 4, a transmission hologram is copied onto recording medium 30 from master transmission hologram 34 in an apparatus wherein the coherent irradiating wavefront is propagated circuitously toward an open end of cylindrical member 20, then directed out of cylindrical member 20 through the interfacially adjacent transmission hologram 34 and recording medium 30. Similar to the configuration of FIG. 3, the coherent irradiating wavefront used for exposure is initially propagated by laser 70, fanned out by beam spreader 72, then collimated by cylindrical collimator 74. A system of mirrors 76a, 76b, 76c is implemented to route the collimated coherent light to an area suitable for the exposure of the recording medium 30 and master transmission hologram 34. Good results have been obtained by the use of a cylindrical lens 78 to intensify the sheet of light prior to exposure.

Figure 5:
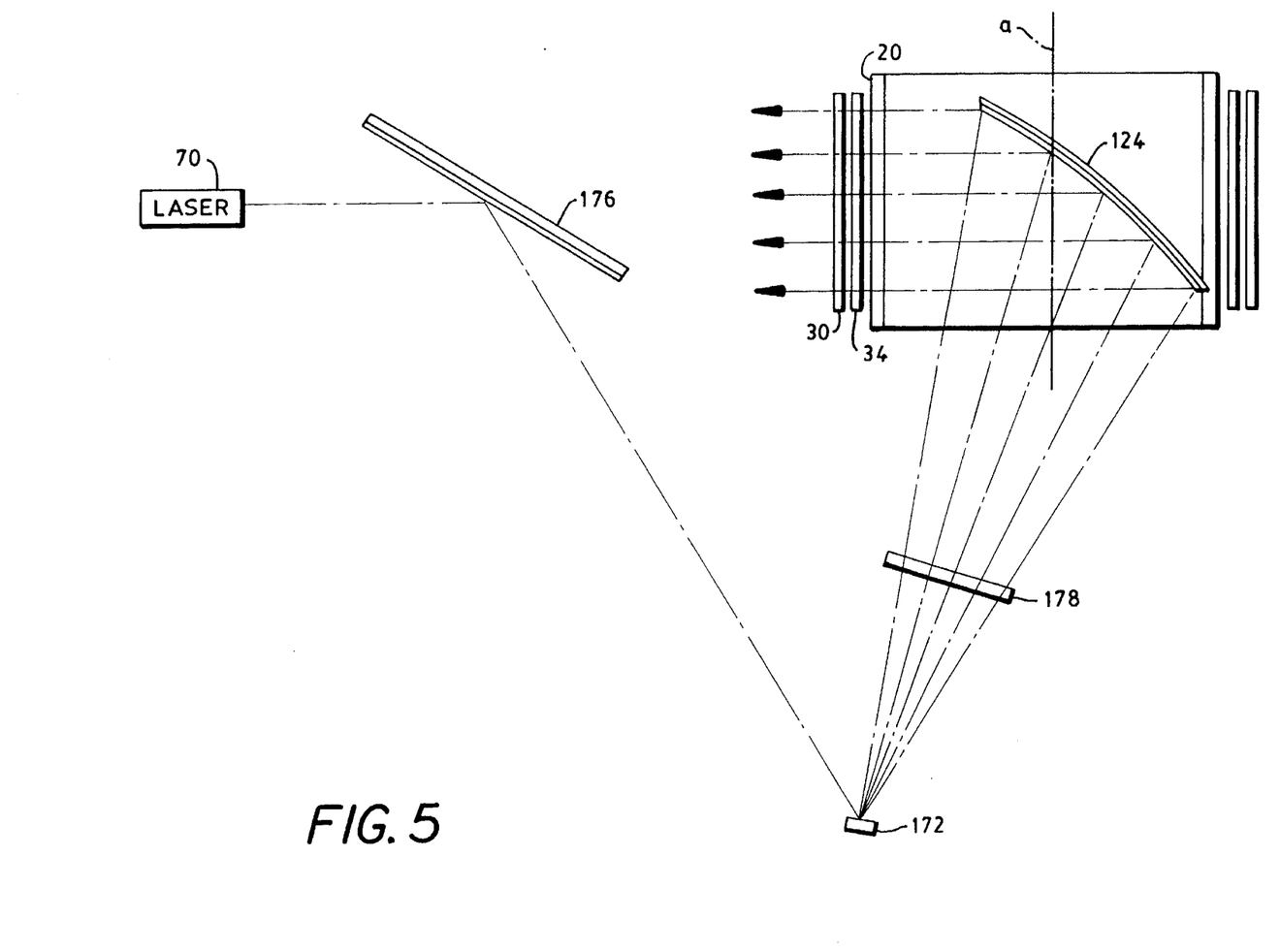
FIG. 5 is a cross-sectional top view of the alternative configuration illustrated in FIG. 4, the alternative configuration further modified to utilize a spinning galvo mirror.

In the configuration shown in FIG. 5, a transmission hologram is copied onto a recording medium from a master transmission hologram in an apparatus wherein a parabolic reflective element 124 is used to direct a coherent wavefront (generated from a beam of irradiation "fanned out" by spinning or oscillating galvo mirror 172) onto the master transmission hologram 34 and recording medium 30. As with the configuration of FIG. 4, a cylindrical lens 178 may be implemented to intensify the light prior to exposure. Such configuration has been found useful in maintaining the intensity of the irradiating wavefront selected for exposure.

While good transmission holograms have been obtained utilizing the above-described configurations, other configurations can be implemented based, for example, on the character of the transmission hologram desired. The specific configurations discussed herein illustrate the broad latitude of variations available in the practice of the present invention. The scope of the present invention should not be limited to any one specific configuration.

It will be appreciated that a transmissive master may be provided on the cylindrical member 20 in several ways other than being wrapped around cylindrical member 20 as illustrated in FIG. 1. For example, the transmissive master(s) may be configured as or on a continuous web spooled around a separate supply roller (not shown) and conveyed to the cylindrical member 20 together and in register with the web of recording medium 30. As with the web of recording medium 30, the continuous web of transmissive master(s) may be wound onto an uptake roll (not shown) subsequent to exposure. Such arrangement may provide advantage for copying several dissimilar transmissive masters or copying a previously recorded and processed web of recording medium As another example, a web of several dissimilar transmissive masters may be looped around the cylindrical member 20 and a separate corresponding roller (not shown). Such arrangement may provide advantage when several dissimilar but repeating transmissive masters are desired, but will not "fit"—due to their size or numbers—onto the cylindrical member 20.

It will be appreciated that the transmissive master provided on the cylindrical member 20 is in certain embodiments integral with the cylindrical member 20. For example, cylindrical member 20 may be made from ground glass. A holographic imager incorporating such ground glass cylindrical member may be used according to the present invention to produce an original holographic diffuser. In a similar manner, the surface of a cylindrical member can be etched with diffraction gratings such that the holographic imager may be utilized in the production of original holographic diffractors. For such embodiments, the ground glass (or etched) surface is considered the transmissive master. Such surface will produce transmitted wavefronts that can combine to form a recordable interference pattern.

For details relating to the production of holographic diffusers reference may be had to S. Waddle, et al., *Holographic Diffusers*, OPTICAL ENGINEERING, Vol. 33, No. 1, p.213 (January 1994). The teachings found in this and other like references may be incorporated into the present invention by one skilled in the art in view of the teachings disclosed herein.

Recording media used in the present invention can be made of a variety of materials: Among the more important are: silver halide emulsions, hardened dichromated gelatin, ferroelectric crystals, photopolymers, photochromics, and photodichroics. Characteristics of these materials are given in *Volume Holography and Volume Gratings*, by L. Solymar and D. J. Cook, Chapter 10, Academic Press, New York, 1981, pages 254–304. The recording material is preferably, DMP-128 (a proprietary photopolymer from Polaroid Corporation, Cambridge, Mass.). Certain details relating to the use of DMP-128 for the production of holographic diffusers—the process being effectively accomplished by the present invention—may be found in M. Wenyon and P. Ralli, Mass Production of *Volume Holographic Diffusers*, 1994 SID INTERNATIONAL SYMPOSIUM DIGEST OF TECHNICAL PAPERS, San Jose, Calif. (Jun. 14–16, 1994) (ISSN 0097-966X).

It will be appreciated that, in certain embodiments, practical factors such as cost and the commercial availability of components may effect the overall configuration and scale (cf., diameter and width) of cylindrical member 20 of holographic imager 10. In a configuration found desirable to applicants, it was found that reflecting element 24 (and supporting means therefor) occupied an area within cylindrical member 20 that constrained readjustment and repositioning of said reflecting element 24. In such configurations, the spatial constraints inside the cylindrical member 20 made it difficult to adjust the angle of incidence of irradiating wavefront.

For certain applications, it is envisioned that there may be no desire to modify the angles of incidence directly obtainable by the adjustment of reflecting element 24. However, in the practice of the invention according to certain goals envisioned by applicants, it is highly desirable to attain angles of incidence of approximately ±11° off-normal. In order to accomplish these angles in those configurations based solely on reflecting element 24, directed wavefronts tend to "walk up" the wall of cylindrical member 20. As this happens, preventing the development of parasitic reflection holograms becomes difficult.

Accordingly, to achieve a greater range of obtainable angles of incidence, a tuning mechanism (e.g., prismatic tuner 50 or a pair of long, thin mirrors, not shown) is suspended inside the cylindrical member 20 close to its floor, the tuning mechanism having a configuration capable of steering (cf., "fine tuning") the wavefront directed by reflecting element 24. In one embodiment, a prismatic tuner 50 is configured to be at least as long as cylindrical member 20, and free of optical aberrations. The prismatic tuner 50 is positioned to intercept the wavefront reflected off reflective optical element 24 and so that rotation s of the prismatic tuner 50 will allow adjustment of the incident angle of the wavefront. As with the reflecting element 24, it will be appreciated that prismatic tuner 50 is also mounted independent of cylindrical member 20. The prismatic tuner 50 can be secured in a desired angle for the duration of the production run. In certain embodiments, the prismatic tuner 50 may be provided with a back light-dump (not shown) suspended inside the clear drum to prevent "scattering" which might compromise the holographic sensitivity of the recording medium 30.

As an alternative to the prismatic tuner 50, it is also envisioned that the functionality provided by said tuning means can be afforded by a system of paired mirrors positioned inside the cylindrical member 20 close to its floor. One of said mirrors will function to intercept the wavefront reflected off reflective optical element 24 and redirect the wavefront to the other of said pair. The wavefront is ultimately focused onto the transmissive master by the agency of the other said mirror, at an angle of incidence different from that obtainable by utilization solely of reflective optical element 24. Either or both of the paired mirrors can be adjusted to effect a desired angle of incidence. As with the prismatic tuner 50, each of the paired mirrors is preferably configured to be at least as long as cylindrical member 20, and free of optical aberrations. As with the prismatic tuner 50 and reflecting element 24, the system of mirrors is mounted independent of cylindrical member 20.

In embodiments of the present invention, it will be desirable to apply or otherwise incorporate an anti-reflection layer, such as a light absorptive coating 52 on either the inside or outside surface of cylindrical member 20. In general, light absorptive coating 52 will reduce internally reflected laser irradiation which may compromise the overall sensitivity of the recording medium 30. Implementation of such anti-reflection layer becomes more important when using the aforementioned prismatic tuner 50 to obtain grazing incident angles of comparatively large magnitude. The internal reflection resultant of such large angles of incidence may result in significant losses in laser irradiation and exposure of the recording media 30 may be inadequate. Light absorptive coating 52 should not be applied over the entire surface of the cylindrical member 20. Rather, at the least, an area corresponding in size to the transmissive master 34 should be left uncoated, otherwise the exposure-wise transmission of a propagated wavefront may be insufficient to produce a desirable and/or complete hologram.

It will be appreciated that "woodgrain" or like image artifacts may result from internal reflections at air/glass or air/substrate surfaces. Such undesired defects may be cured by dripping an index-matching fluid such as xylene onto the surface of the cylindrical member 20. Accordingly, the holographic imager 10 may be equipped with means for applying a coupling liquid, such as xylene, with a refractive index matched to optically couple and minimize reflections between the recording medium and the master transmission hologram prior and/or during exposure. Such application means encompass structures whereby liquid may be dripped, sprayed, rolled, or otherwise applied to the master and/or the recording medium, generally in the vicinity of where they come into contact with each other.

In the embodiment illustrated in FIG. 1, index-matching fluid is applied to (1) the substrate/air/substrate interface existing between the master transmission hologram 34 and the recording medium 30, and (2) the substrate/air interface existing at the surface of the recording medium 30 opposite the master transmission hologram 34.

In the application of index-matching fluid to said substrate/air/substrate interface, a drip system 60 is provided above cylindrical member 20. During operation of holographic imager 10, an appropriate amount of index-matching fluid is gradually dripped down toward the cylindrical member 20, contacts and spreads across the surface of the master transmission hologram 34, and eventually fills said interface when recording medium 30 is brought into register with the master transmission hologram.

In the application of index-matching fluid to said substrate/air interface, a bath system 62 is provided under cylindrical member 20, generally opposite drip system 60. Bath system 62 comprises a vessel containing a reservoir of index-matching fluid, the vessel being colored or made of a light-absorptive material. During operation of holographic imager 10, a ventral region of cylindrical member 20 is submerged into the reservoir of index-matching fluid contained in bath system 62, thereby eliminating said substrate/air interface. It will be appreciated from FIG. 1, that reflective element 24 is arranged to direct irradiating wavefront toward area submerged in bath system 62. Since bath system 62 is light-absorptive, the possibility of undesirable reflection is reduced.

It will be understood that the holographic imager 10 may also include means (not shown) for removing the index-matching liquid from one or both sides of the recording medium after exposure and before it is wound on the rewind roll 42. It will also be understood that certain recording mediums 30 are inherently capable of optically coupling to the master 35 without the need for a coupling liquid. For instance, a tacky recording medium has been shown to adequately couple to a master, such as a metallized polyester film, without the need for a coupling liquid.

According to a method aspect of the present invention, transmission holograms can be made by utilizing a rotatable cylindrical member having thereon—in an area configured to substantially transmit an irradiating wavefront—a transmissive master. The transmissive master may be in the form of a master transmission hologram affixed or otherwise attached to the outer surface of the cylindrical member in the wavefront transmissive area, such as by tape.

Among the steps of the method, the cylindrical member is rotated while conveying a recording medium onto said cylindrical member in register with said transmissive master. In a particular mode of practice, during rotation of the cylindrical member, a portion of a web (or individual sheet) of holographic recording medium is unwound from a supply roll (or fed from a tray) and positioned partially around the cylindrical member in register with the master transmission hologram. During the rotation of the cylindrical member and the conveying of the recording medium, it will be appreciated that advantage can be derived by maintaining the recording medium in non-sliding relationship with the master transmission hologram throughout the duration of exposure. When using an apparatus such as illustrated in FIG. 1, a non-sliding relationship can be accomplished by maintaining tensional forces between rollers 20 and 42 such that the web of recording medium 30 is tightly urged (i.e., not loose) against cylindrical member 20.

Occurring contemporaneously with the rotating of the cylindrical member and the conveying of the recording medium, the transmissive master is scan-wise irradiated through the cylindrical member with an irradiating wavefront to produce transmitted wavefronts which combine to form an interference pattern in the recording medium. Since the recording medium is positioned in register with the master transmission hologram, an irradiating wavefront—appropriately directed by, for example, a reflective element contained inside the cylindrical member—will pass through the master transmission hologram with the modified components thereof combining and ultimately exposing the recording medium to form a latent recording of a resultant interference pattern. In the practice of the inventive method, it will be appreciated that scan-wise irradiation will be accomplished by fixedly directing the irradiating wavefront at a substantially constant angle of incidence to thereby sequentially expose said transmissive master and recording medium as these pass the localized area of irradiation. In a particular mode of practice, the irradiating coherent wavefront is initially propagated through an open end of the cylindrical member 20 substantially along its longitudinal axis $\alpha$ towards a reflective element (configured as described for the above apparatuses). The reflective element should be able to redirect the wavefront through the master toward the recording medium once each revolution of the cylindrical member in scan-wise, sequential manner.

In general, good recording conditions can be achieved by maintaining the exposure angle constant throughout the exposure area. In this regard, it will be appreciated that if the angle of incidence varies during the scanwise irradiation, imaging efficiency will be reduced. This would produce an effect comparable to the tilting or rotating of a recording material when contact copying in a plane. A constant exposure angle is accomplished in the present invention by using the aforementioned cylindrical optics to produce and focus a sheet-like beam onto the cylinder axis.

Subsequent to its exposure, the recording medium may then be processed to develop the recorded latent interference pattern and thereby produce a transmission hologram. In a particular mode of practice, after recording several copies (or producing several original holograms) on a web, the web of recording medium is removed from roller 42 then developed, for example, to intensify the imaged element (such as by treatment with 2-isopropanol in the case of DMP-128), or to "fix" (or otherwise make more stable) photopolymeric reaction products (cf., fringe structures) actinically generated by the scan-wise irradiation. Certain details concerning the use and processing of photopolymerizable compositions used for holographic recordings can be found, for example, in U.S. Pat. No. 4,588,664, issued to H. L. Fielding and R. T. Ingwall on May 13, 1986; U.S. Pat. No. 4,696,876, issued to J. J. Cael on Sep. 27, 1987, and U.S. Pat. No. 5,198,912, issued to R. T. Ingwall, M. A. Troll, and D. H. Whitney on Mar. 30, 1993. Those skilled in the art will know of the various methods for processing the various types of recording media that may be used in the present invention.

It will be appreciated that subsequent processing will depend on the nature of the selected recording medium Accordingly, construction of the term "development" will compel consideration of the processes desired and/or required to finalize, or otherwise prepare for use, a particular imaged recording medium.

Those skilled in the art, having the benefit of the teaching of the present invention set forth herein, can effect numerous modifications thereto. These modifications are to be construed as being encompassed within the scope of the present invention as set forth in the appended claims.

We claim:

1. A holographic imager useful in the production of a transmission hologram on a recording medium, the holographic imager comprising a radiation source for propagating an irradiating wavefront, the irradiating wavefront effecting the production of transmitted wavefronts where said irradiating wavefront is transmitted through a transmissive master, the transmitted wavefronts combining to form a recordable interference pattern, the interference pattern being holographically representative of the transmissive master;

a cylindrical member continuously rotatable on a longitudinal axis, an area of the cylindrical member configured to substantially transmit said irradiating wavefront, the cylindrical member having the transmissive master in said area, the transmissive master producing said transmitted wavefronts where exposed to said irradiating wavefront;

means for continuously conveying the recording medium onto the cylindrical member in register with the transmissive master; and directing means for directing said irradiating wavefront propagated from the radiation source through the transmissive master toward the recording medium in a single predetermined direction as the cylindrical member continuously rotates the directing means configured so that said single predetermined direction is fixedly maintained independent of the rotation of the cylindrical member, the directing means comprising a reflective optical element, the reflective optical element being mounted independently from the cylindrical member, the reflective optical element positioned to reflect the irradiating wavefront propagated from the radiation source through the transmissive master at an angle of incidence appropriate to effect production of said transmitted wavefronts.

2. The holographic imager of claim 1, wherein the directing means further comprises tuning means inside said cylindrical member, the tuning means capable of intercepting the irradiating wavefront reflected by said reflective optical element and thereby adjusting said angle of incidence.

3. The holographic imager of claim 1, wherein the reflective optical element is a substantially flat mirror.

4. The holographic imager of claim 2, wherein the tuning means is a prism.

5. The holographic imager of claim 1, wherein the reflective optical element is a holographic optical element.

6. The holographic imager of claim 1, wherein the cylindrical member is provided with an anti-reflection layer applied to an internal surface therein, the anti-reflection layer being applied outside said area of the cylindrical member configured to substantially transmit said irradiating wavefront, the anti-reflection layer capable of absorbing said irradiating wavefront.

7. The holographic imager of claim 1, wherein the transmissive master is said area of the cylindrical member configured to substantially transmit said irradiating wavefront.

8. The holographic imager of claim 7, wherein the cylindrical member is made of ground glass in said area of the cylindrical member configured to substantially transmit said irradiating wavefront, whereby the holographic imager can be used in the production of holographic diffusers.

9. The holographic imager of claim 1, wherein the reflective optical element is a parabolic mirror.

10. The holographic imager of claim 1, wherein said means for continuously conveying is a continuous supply means for conveying a continuous web of said recording medium onto the cylindrical member in register with the transmissive master.

11. A method for producing transmission holograms on a recording medium, the method comprising the steps of providing a cylindrical member rotatable on a longitudinal axis, an area of the cylindrical member configured to substantially transmit an irradiating wavefront, the cylindrical member having a transmissive master, the transmissive master producing transmitted wavefronts where exposed to an irradiating wavefront, the transmitted wavefronts combining to form a recordable interference pattern, the interference pattern being holographically representative of the transmissive master;

rotating said cylindrical member continuously while conveying the recording medium onto said cylindrical member in register with said transmissive master;

scanning said transmissive master with an irradiating wavefront to produce transmitted wavefronts which combine to form said interference pattern in the recording medium, the interference pattern thereby being latently recorded in the recording medium, said scanning occurring contemporaneously with said rotating of said cylindrical member and said conveying of said recording medium, said irradiating wavefront being fixedly directed at a substantially constant angle of incidence and sequentially exposing said transmissive master and recording medium in passing; and processing the recording medium to develop the latent interference pattern, whereby a transmission hologram is produced.

12. The method of claim 11, wherein the scanning of the transmissive master is effected by first propagating an irradiating wavefront through an open end of the cylindrical member, then redirecting said wavefront through the transmissive master toward the recording medium at said substantially constant angle of incidence.

13. The method of claim 12, wherein an optical element is employed to redirect the wavefront.

14. The method of claim 13, wherein the optical element is a holographic optical element.

15. The method of claim 13, wherein the optical element is a mirror.

16. The method of claim 11, wherein the transmissive master is a master transmission hologram, and whereby the method is used to produce copies of said master transmission hologram.

17. The method of claim 11, wherein the cylindrical member is made of ground glass in said area of the cylindrical member configured to substantially transmit said irradiating wavefront, thereby providing said transmissive master, and whereby the method is used to produce original holographic diffusers.

* * * * *